May 10, 1966  T. W. HALLERBERG  3,251,049
MASTER WARNING INDICATOR SYSTEM
Filed Jan. 9, 1964  2 Sheets-Sheet 1
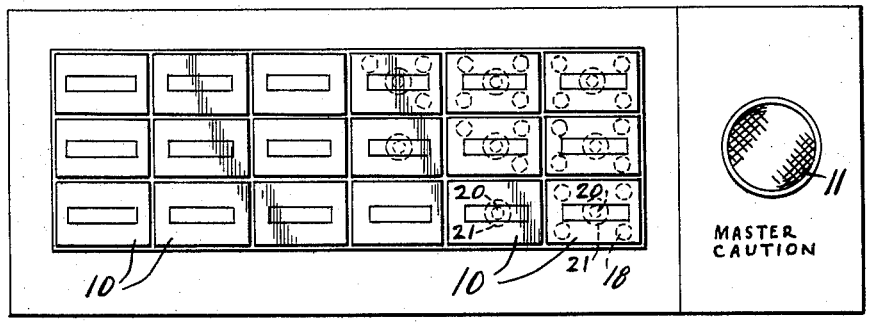
FIG-1-
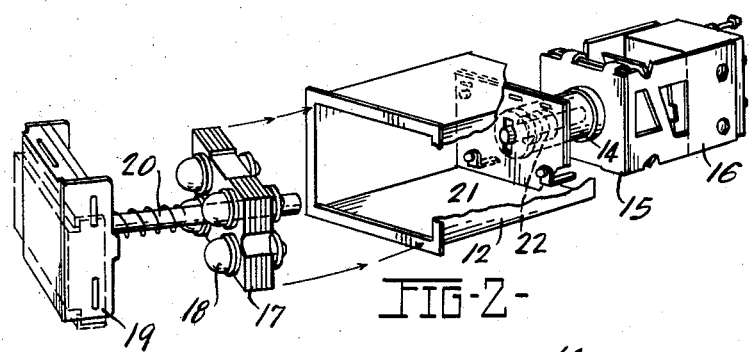
FIG-2-
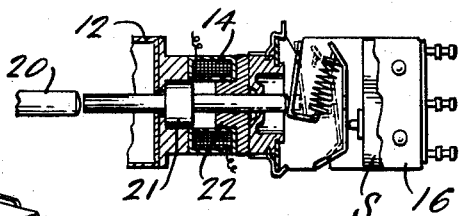
FIG-4-
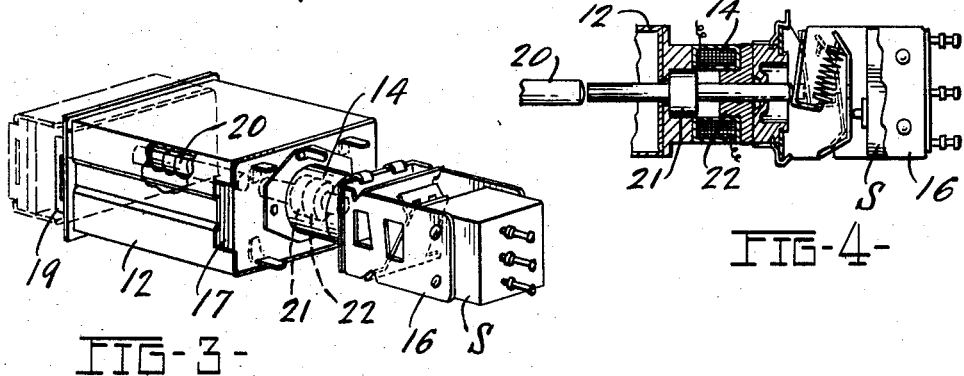
FIG-3-
INVENTOR:
THEODORE W. HALLERBERG.
BY
ATT'YS.

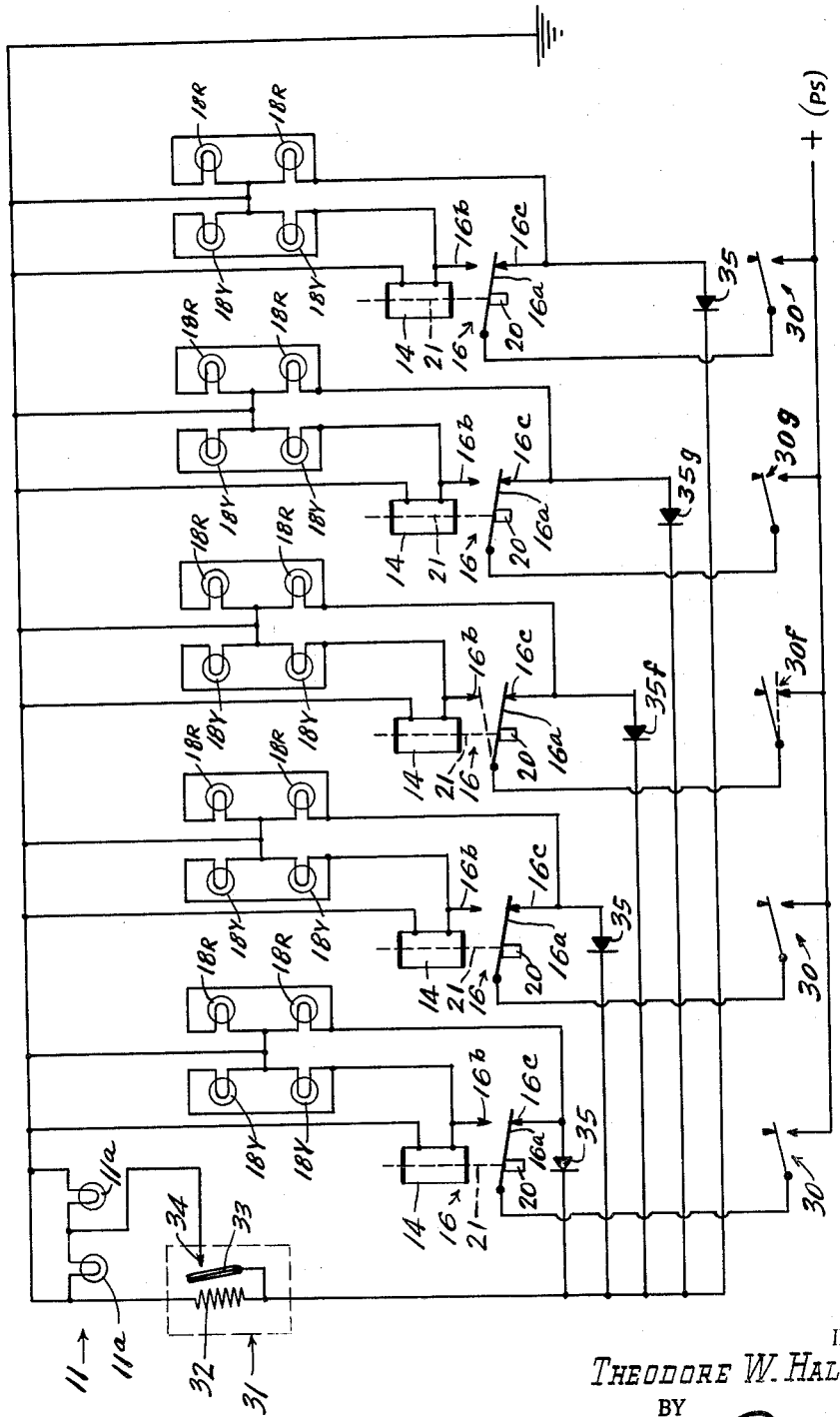
FIG-5-
INVENTOR:
THEODORE W. HALLERBERG.
BY
ATT'YS.

3,251,049
MASTER WARNING INDICATOR SYSTEM
Theodore W. Hallerberg, Rolling Hills, Calif., assignor to Master Specialties Company, Gardena, Calif., a corporation of California
Filed Jan. 9, 1964, Ser. No. 336,838
1 Claim. (Cl. 340—213.1)

This invention relates to master warning indicator systems and is particularly directed to an improved system in which the initial warning is given by a light of one color, while a retained and acknowledged warning is given by a light of a different color.

In defense systems wherein a large number of events are continually monitored by an operator to determine changes in state, it is virtually impossible to keep an adequate vigil with respect to each of said changes in state. A remote display panel may contain several hundred signal or warning lights. For protection against burnout, each signal is displayed by a pair of paralleled lamps which illuminate respective indicator visual signal displays or "source indicators." The lamps and their associated switches, diodes and related circuitry are all disposed in a miniaturized unit measuring about ¾" x 1¼" x 2½".

In addition to the remote panels, it is desirable to provide a master indicator which has a relatively bright warning light to announce the onset or existence of a predetermined condition at a remote location.

A switch, usually termed a "fault switch," responds to a predetermined condition at a remote location and causes the appropriate source indicator to operate giving a visual indication of the closure of that fault switch, at the same time that the master indicator is illuminated. In accordance with the present invention, the initial indication of the source indicator is given in a light of one color, preferably red, and the master indicator signal is given as a flashing red light.

When the warning has been given the operator may then acknowledge the fault by closing a switch associated with the illuminated source indicator. This action will re-set the master indicator unit. When the master indicator is turned off and reset, the source indicator, instead of burning with its initial red indication, will continue to glow with a second color, for example yellow, until the fault has been cleared and the fault switch opened.

The system of the present invention may find use in ground installations or appropriately in aircraft. In this latter type of application, there are a great number of events which must be registered such as, for example, engine temperature of each of a plurality of engines, oil pressure at various points in a lubricating system, fuel level, fuel tanks switched on, wheel conditions, flap conditions, etc. The pilot with his other duties may not notice the lighting of any one source indicator within a large bank, particularly when certain of the indicators are lighted to indicate normal conditions (for example "flaps down" when this is the expected and intended condition). Accordingly, the present invention provides the pilot with a single master warning light directly within his viewing range which is preferably flashed on and off to signal the onset of a new monitored condition or the closure of an additional fault switch. The pilot may then inspect the source light panel to determine if the condition is normal or abnormal or what action should be taken. Thereafter, he may press the face of the source indicator to actuate at reset switch which will turn off the flashing master caution signal and will change the color of the display on the source indicator panel from its initial color to its secondary color or, for example, from red to yellow. If another fault switch should close at a later time, the cycle will be repeated in that the master caution signal will again commence to flash red and one of the source indicators, associated with the newly closed fault switch, will light up in its initial red color.

One of the objects of the invention is to provide a master warning system which is simple in that an absolute minimum of contacts are required which may be troublesome. Prior devices serving the purpose intended by the present invention are characterized by a multiplicity of relays, each containing a number of vulnerable contacts, or are constructed around vulnerable electronic switches such as transistors.

Another object of the invention is to provide a master warning system in which each source indicator unit is an entity that may be replaced quickly and that may be re-bulbed from the front of the panel if necessary.

Other objects and advantages of the invention will become apparent from the following detailed description of a preferred form thereof, reference being had to the accompanying drawings, in which:

FIGURE 1 is a diagrammatic elevational view of an indicator panel comprising a series of source indicators and a single master caution light;

FIG. 2 is a front perspective view, with parts in section and parts broken away of a suitable form of source indicator;

FIG. 3 is a rear elevational view, with the parts assembled, of the source indicator shown in FIG. 2;

FIG. 4 is a fragmentary sectional view taken on line 4—4 of FIG. 3; and

FIG. 5 is a circuit diagram showing the relationship between the various components of the invention.

Referring to the drawings, and particularly to FIG. 1, the present invention is usable in a panel indication system in which a plurality of source indicators, each designated 10, is used to monitor a different variable or condition. A single master caution light 11 is used, and may be in juxtaposition to the series of source indicators 10 or may be at some remote point, such as immediately in front of an aircraft pilot.

Each of the source indicators is preferably constructed in accordance with the disclosure of the patent to Don M. Hallerberg No. 3,090,949, issued May 21, 1963. As indicated in FIGS. 2 and 3, each source indicator comprises a housing 12 of a size that will fit readily through a pre-cut panel opening. The housing is closed at its back end by an insulating partition 13 on which the several contacts necessary for operation of the unit are disposed. A solenoid holding coil 14 extends beyond the rear of the insulating partition and is in the form of a hollow solenoid. Back of the solenoid 14 is a plate 15 on which a switch 16 is mounted.

A removable lamp capsule comprising a lamp mounting plate 17 on which a series (preferably four) of indicator lights 18 are mounted, includes a front, legend-bearing operator and legend-bearing lens assembly 19. A switch actuating rod 20 extends from the rear of the operator 19 and passes through the lamp mounting plate 17, and into engagement with the armature 21 of the solenoid 14 and thus is arranged to move the actuating mechanism for switch 16 when the parts are in the assembled position as shown in FIG. 3. When the operator presses inwardly on the legend-bearing lens assembly 19, the operating rod 20, through the solenoid armature 21, throws the switch 16 from one position to another, and if the circuit is properly arranged, the parts will be held in the switch-actuated position by the action of the solenoid 14. The armature 21 of the solenoid 14 carries a large iron disc 22 to provide sufficient force to hold the switch 16 in actuated position as long as current is flowing in the solenoid coil. Switch actuators of this nature are known in the art. The source indicator so far described bears a legend identifying the circuit or function to which it is connected or which it monitors. When the lamps are turned on the legend is illuminated and clearly identifiable to the operator. After actuating the switch 16, the switch actuating rod 20 and the lens assembly 19 return to normal position with the lens essentially flush with the front of the unit.

Switch 16 is a conventional device having three contacts, with arrangements such that a normally open circuit exists between a center contact 16a and one of the outer contacts 16b, while a normally closed circuit exists between the center contact and the other of the outer contacts 16c. When the switch is operated, the circuit through normally closed contact 16c is opened and the circuit through the normally opened contact 16b is closed. When the operating force is released, the contacts revert to their normal position. Such switches are widely used in conjunction with indicating devices of this nature and are well known in the art.

A preferred circuit for the invention is shown in FIG. 5. The parts so far described are indicated by the same reference numerals in this figure. The indicator lamps 18 are shown as a pair of paralleled red lamps 18R, and a pair of paralleled yellow lamps 18Y. The solenoid holding coil associated with each of the source indicators 10 is shown at 14 in the circuit diagram and the contacts on switch 16 are also indicated on the circuit diagram as movable contact 16a, normally open contact 16b and normally closed contact 16c. The normally closed contact 16c in each of the switches 16 is connected to the red indicator lamps 18R, while the normally open contact 16b is connected to the solenoid holding coil 14 and, in series, to the paralleled yellow lamps 18Y. Thus when the movable contact 16a closes against the normally open contact 16b, a circuit is completed through the holding coil 14 and through the paralleled yellow lamps 18Y. In FIGURE 5, the armature 21 for the holding coil 14 in indicated as a dashed line connected to the movable switch contact 16a. As above noted, this connection is an operative abutting connection.

As indicated in FIG. 5, each of the fault circuits includes a fault switch 30 which is normally open, but which is closed upon the occurrence of a monitored event or condition. The fault switches are connected to one side of a power source (PS) while the movable contact member of each fault switch is connected directly to a movable contact 16a of a respective one of the switches 16.

The master caution light is indicated in FIG. 5 as including a pair of paralleled lamps 11a. The circuit to these lamps includes a flasher 31, having the usual heating element 32, and a bimetallic contact member 33 which opens and closes in response to a change in its temperature against a stationary contact 34 which is connected to the indicating lamps 11a. The circuit to the flasher is completed from each of the fault switches 30 through the normally closed contacts 16c and through an isolating diode 35 poled in the direction of the flasher 31 and master caution light 11 so that closure of one of the fault circuits will not affect any of the source indicators but the one to which the respective diode 35 is connected. Diode isolation in this connection is known in the art.

It will be seen that as many source indicators as desired may be connected with the single master caution light. Assuming that the fault switch designated 30f in FIG. 5 is closed, it will be seen that a circuit is completed from the power source (PS) to switch 16, through the movable contact 16a to the normally closed contact 16c, through diode 35f to the flasher, through the flasher coil 32 to ground and to the flasher bimetallic arm 33. Before the arm 33 becomes heated and moved, a circuit is completed through arm 33 to the flasher contact 34 and thus to the paralleled master caution lights 11a and to ground so that these lights will be illuminated. At the same time, the circuit from normally closed contact 16c is completed through the red lights 18R in the source indicator associated with that particular fault switch 30f.

The lights 18R will thus illuminate the source indicator in red, and the master caution light will flash. When the operator acknowledges the existence of the fault, he merely pushes in on the switch actuating member 19 to move the operating rod 20 rearwardly against armature 21 of the solenoid to move the contacts of the switch 16 from the normally closed position to the point where a circuit is completed through movable contact 16a and normally open contact 16b. By this movement of the switch 16, the circuit through the master caution light 11 is opened, the circuit through the red source indicator lights 18R is opened and a circuit through the solenoid holding coil 14 and the yellow source indicator lights 18Y is closed. Since the armature 21 for the holding coil 14 is held in place by flux through the disc 22, the contacts will stay in the switched position so long as switch 30f remains and current flows through coil 14. The master caution light has been extinguished and its circuit reset, ready for indication of a new malfunction or the closure of another fault switch. The yellow light indication will persist until the fault switch with which it is associated is opened by clearing the fault or by the termination of the monitored event.

Assuming that one of the source indicators is glowing in yellow, closure of another fault switch 30g, for example, will complete a new circuit to the master caution light 11, the red lamps 18R of its associated source indicator and, of course, to the flasher 31. The master caution light will then begin to flash on and off with a suitable colored indication and the red lamps 18R associated with the newly closed fault switch 30g will be illuminated. In the meantime, of course, the yellow lights associated with the previously closed fault switch 30f continue to glow. Acknowledgment of the new fault by pressing in on the lamp capsule associated with the source indicator connected to fault switch 30g will change the color of the indicating from red to yellow as before, at the same time that the master caution light is again extinguished.

While the invention has been shown in conjunction with a specific circuit, it should be appreciated that numerous modifications may be made therein without departing from the scope of the appended claim. If desired, various safety devices may be incorporated to indicate the malfunction of any of the components, and the flasher may be omitted if desired in which case the master caution signal would glow with a steady light during the time that any of the source indicator circuits has been closed and its fault has not been acknowledged by the operator.

What I claim is:

A warning system comprising a power source, a plurality of parallel fault circuits connected to said power source and each including a fault switch closable in response to a change in a monitored condition, a master warning light having a connection normally in series with all of said fault switches, isolating diodes in each of said fault circuits to prevent cross closure thereof from said monitor light connection, a plurality of illuminable source indicators each containing lights of a first color normally in series with said fault switches and in parallel with said master warning light and also containing lights of a second color, a manually operable switch included in each of said source indicators having a normally closed contact connected to said first color lights and to said master warning light, a normally open contact connected to said second color light and a movable contact connected to said fault switch circuit, whereby when said switch is manually moved from said normally closed position to its normally open position the color displayed by said source indicator is changed from said first color to said second color provided its associated fault switch is closed and at the same time the circuit to said master warning light is opened, and a holding coil in parallel with said second color lights to retain said normally open contacts closed until said associated fault switch is opened.

References Cited by the Examiner

UNITED STATES PATENTS

| | | | |
|---|---|---|---|
| 2,942,249 | 6/1960 | Paull | 340—327 X |
| 3,029,421 | 4/1962 | Beguin | 340—213.1 |
| 3,128,457 | 4/1964 | Culbertson | 340—213.1 |

NEIL C. READ, *Primary Examiner.*

R. M. ANGUS, *Assistant Examiner.*